(12) United States Patent
Kumar

(10) Patent No.: US 10,030,694 B2
(45) Date of Patent: Jul. 24, 2018

(54) ADJUSTABLE JOINTS

(71) Applicant: Ingersoll-Rand Company, Davidson, NC (US)

(72) Inventor: Sanjeev Kumar, Bangalore (IN)

(73) Assignee: Ingersoll-Rand Company, Davidson, NC (US)

( * ) Notice: Subject to any disclaimer, the term of this patent is extended or adjusted under 35 U.S.C. 154(b) by 195 days.

(21) Appl. No.: 14/108,345

(22) Filed: Dec. 17, 2013

(65) Prior Publication Data

US 2015/0167731 A1    Jun. 18, 2015

(51) Int. Cl.
| | |
|---|---|
| *F16C 11/06* | (2006.01) |
| *F16C 11/10* | (2006.01) |
| *F16M 11/14* | (2006.01) |

(52) U.S. Cl.
CPC .......... *F16C 11/106* (2013.01); *F16M 11/14* (2013.01); *F16C 2322/50* (2013.01); *Y10T 29/49718* (2015.01); *Y10T 403/32286* (2015.01)

(58) Field of Classification Search
CPC ..... Y10T 403/32032; Y10T 403/32196; Y10T 403/32311; Y10T 403/32786; Y10T 403/32286; F16C 11/0647; F16C 11/106; F16C 2322/39; F16M 11/2078; F16M 11/14; F16M 2200/022; F21V 21/145; F21V 21/29
See application file for complete search history.

(56) References Cited

U.S. PATENT DOCUMENTS

| | | | |
|---|---|---|---|
| 892,105 A | 6/1908 | White | |
| 926,114 A * | 6/1909 | Hall | B26J 6/02 |
| | | | 248/230.5 |
| 973,319 A | 10/1910 | Thunen et al. | |
| 1,303,345 A | 5/1919 | McFeaters | |
| 1,324,456 A | 12/1919 | Lutz | |
| 2,346,346 A * | 4/1944 | Anderson | A61B 17/6441 |
| | | | 403/76 |
| 2,472,549 A | 6/1949 | Schulze | |
| 2,700,523 A * | 1/1955 | Pollard | F16M 11/14 |
| | | | 248/181.1 |

(Continued)

FOREIGN PATENT DOCUMENTS

| | | | | |
|---|---|---|---|---|
| GB | 688685 A | * | 3/1953 | ............ F16C 11/106 |
| WO | WO 2013100838 A1 | * | 7/2013 | ............ F16M 11/14 |

OTHER PUBLICATIONS

Ingersoll-Rand Company, "Fixtured Fastening Systems", 2008, 12 pages.

*Primary Examiner* — Matthieu F Setliff
*Assistant Examiner* — Matthew R McMahon
(74) *Attorney, Agent, or Firm* — Barnes & Thornburg LLP

(57) ABSTRACT

In at least one illustrative embodiment, an adjustable joint comprises a housing, a pair of wedges arranged in the housing, and a threaded fastener engaged with at least one of the pair of wedges. The housing may include a first cavity that is sized to receive a spherical end of a shaft and a second cavity that is sized to receive a tube. The pair of wedges may be arranged between the first and the second cavities. The threaded fastener may be configured to (i) move the pair of wedges away from one another when rotated in a first direction and (ii) move the pair of wedges toward one another when rotated in a second direction opposite the first direction.

11 Claims, 5 Drawing Sheets

(56) References Cited

U.S. PATENT DOCUMENTS

| | | | |
|---|---|---|---|
| 3,240,516 A * | 3/1966 | Barish | A61G 13/12 248/284.1 |
| 3,577,659 A * | 5/1971 | Kail | 434/58 |
| 3,622,112 A * | 11/1971 | Stroh | F16M 11/048 248/181.1 |
| 3,843,083 A | 10/1974 | Angibaud | |
| 3,851,979 A * | 12/1974 | Becker | F16L 3/14 248/62 |
| 4,240,603 A | 12/1980 | Chiariello | |
| 4,307,864 A | 12/1981 | Benoit | |
| 4,708,510 A * | 11/1987 | McConnell et al. | 403/90 |
| 4,980,805 A * | 12/1990 | Maglica | B62J 6/00 248/288.31 |
| 5,062,026 A * | 10/1991 | Maglica | B62J 6/00 248/182.1 |
| 5,109,321 A * | 4/1992 | Maglica | B62J 6/00 248/288.31 |
| 5,128,841 A * | 7/1992 | Maglica | B62J 6/00 248/288.31 |
| 5,184,884 A * | 2/1993 | Maglica | B62J 6/00 362/191 |
| 5,249,766 A * | 10/1993 | Vogt | F16C 11/106 248/181.1 |
| 5,270,911 A * | 12/1993 | Maglica | B62J 6/00 248/288.51 |
| 5,297,445 A * | 3/1994 | Chen | 74/551.3 |
| 5,393,161 A * | 2/1995 | Mata et al. | 403/133 |
| 5,419,522 A | 5/1995 | Luecke et al. | |
| 5,474,350 A * | 12/1995 | Gauthier | A01B 1/00 16/426 |
| 5,672,176 A * | 9/1997 | Biedermann | A61B 17/7032 606/271 |
| 5,681,319 A * | 10/1997 | Biedermann | A61B 17/7032 606/104 |
| 5,806,821 A | 9/1998 | Phillips et al. | |
| 5,860,728 A | 1/1999 | Maglica | |
| 6,328,269 B1 * | 12/2001 | Krautloher | 248/288.11 |
| 6,835,196 B2 * | 12/2004 | Biedermann | A61B 17/7032 606/308 |
| 7,090,181 B2 * | 8/2006 | Biba et al. | 248/288.31 |
| 7,300,028 B2 | 11/2007 | Vogt | |
| 7,427,113 B2 * | 9/2008 | Choi | 301/124.1 |
| 7,637,686 B2 * | 12/2009 | Wood et al. | 403/302 |
| 7,698,969 B2 | 4/2010 | Hansson | |
| 7,726,618 B2 | 6/2010 | Pedemonte | |
| 7,993,069 B2 | 8/2011 | Persson | |
| 8,025,455 B2 * | 9/2011 | Huang | F16B 7/1418 280/287 |
| 8,106,278 B2 * | 1/2012 | Eason | 84/421 |
| 8,663,290 B2 * | 3/2014 | Doubler et al. | 606/269 |
| 2005/0254238 A1 * | 11/2005 | Parker | A42B 3/044 362/191 |
| 2008/0269809 A1 * | 10/2008 | Garamszegi | 606/305 |
| 2009/0169293 A1 | 7/2009 | Hansson | |
| 2011/0040336 A1 * | 2/2011 | Hammill et al. | 606/305 |
| 2011/0077694 A1 * | 3/2011 | Biedermann et al. | 606/305 |

* cited by examiner

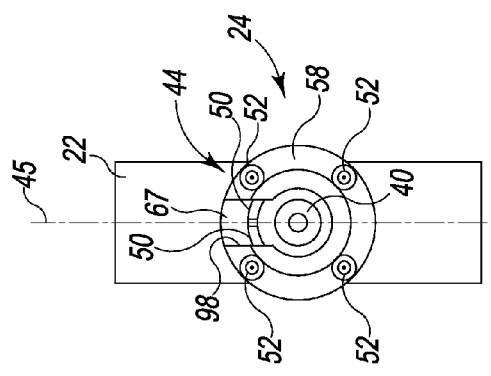
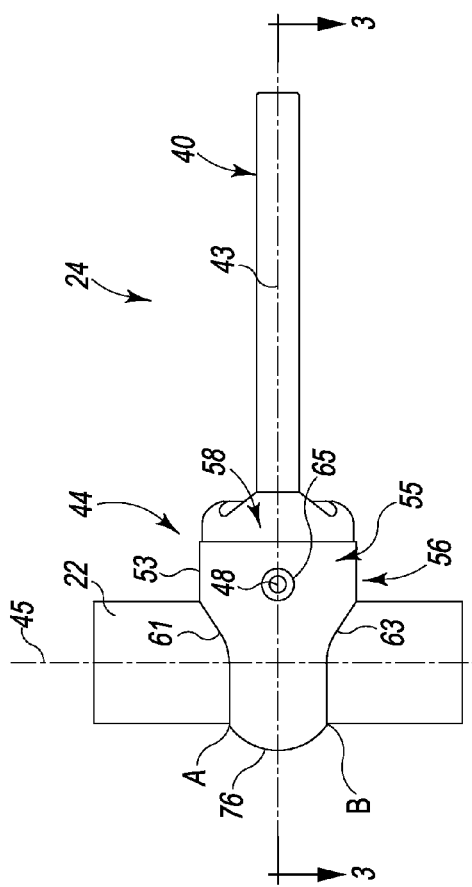
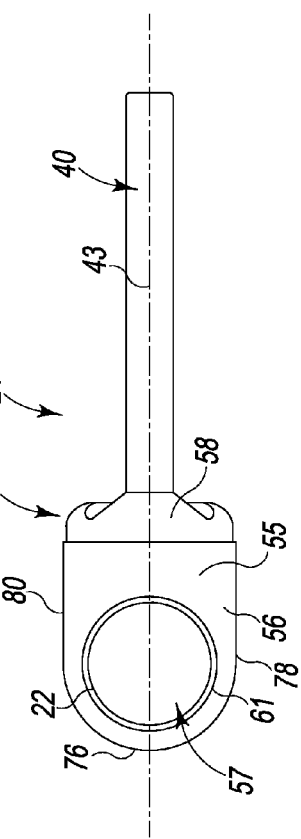
Fig. 2A
Fig. 2B
Fig. 2C

ADJUSTABLE JOINTS

TECHNICAL FIELD

The present disclosure relates generally to adjustable joints, which may be used with power tool fixtures, by way of illustrative example.

BACKGROUND

Power tool fixtures sometimes use adjustable joints to mount one or more devices (e.g., handles, control boxes, etc.) to a frame. Such adjustable joints are typically configured to selectively lock to resist or prevent movement of components of the joint relative to one another and unlock to allow repositioning of the components of the joint. By way of example, an adjustable joint coupling a device to a frame of a power tool fixture may allow repositioning of the device at a number of positions relative to the frame.

SUMMARY

According to one aspect, an adjustable joint may comprise a housing formed to include a first cavity that is sized to receive a spherical end of a shaft and a second cavity that is sized to receive a tube, a pair of wedges arranged in the housing between the first and second cavities, and a threaded fastener engaged with at least one of the pair of wedges and configured to (i) move the pair of wedges away from one another, when the threaded fastener is rotated in a first direction, and (ii) move the pair of wedges toward one another, when the threaded fastener is rotated in a second direction opposite the first direction.

In some embodiments, each of the pair of wedges may be formed to include a bore that receives the threaded fastener. The bore formed in one of the pair of wedges may include threading that engages the threaded fastener. The bore formed in the other one of the pair of wedges may optionally not include threading that engages the threaded fastener.

In some embodiments, each of the pair of wedges may comprise a first side that faces the first cavity and that is formed with a conical recess configured to engage the spherical end of the shaft when the pair of wedges are moved toward one another. Each of the pair of wedges may comprise a planar second side that faces the second cavity and is configured to engage the tube when the pair of wedges are moved toward one another. Each of the pair of wedges may be formed to include a channel extending between the first and second sides.

In some embodiments, the housing may be formed to include a first aperture that opens to the first cavity, a second aperture that opens to the second cavity, and a third aperture that opens to the second cavity, the second and third apertures being formed in opposing sides of the housing. A first hypothetical axis that passes through the first aperture may be perpendicular to a second hypothetical axis that passes through the second and third apertures.

In some embodiments, the housing may comprise a main body and a cap removably coupled to the main body. The first aperture may be formed in the cap, and the second and third apertures may be formed in the main body. The cap may comprise a lip that extends inwardly toward the first aperture and that is configured to retain the spherical end of the shaft in the first cavity. The threaded fastener may pass through a fourth aperture that is formed in the main body of the housing.

According to another aspect, an adjustable joint may comprise a housing formed to include a first cavity, a shaft having a spherical end, the spherical end being received in the first cavity, a pair of wedges arranged in the housing, and a fastener engaged with at least one of the pair of wedges and configured to (i) move the pair of wedges away from one another to permit movement of the shaft relative to the housing and (ii) move the pair of wedges toward one another to cause the pair of wedges to exert a clamping force on the spherical end of the shaft to resist movement of the shaft relative to the housing.

In some embodiments, the adjustable joint may further comprise a tube that extends through a second cavity formed in the housing. The pair of wedges may be arranged in the housing between the first and second cavities. The pair of wedges may be configured to (i) permit movement of the tube relative to the housing, when the pair of wedges are moved away from one another, and (ii) exert a clamping force on the tube to resist movement of the tube relative to the housing, when the pair of wedges are moved toward one another. Each of the pair of wedges may comprise a planar second side that faces the second cavity and engages the tube when the pair of wedges are moved toward one another. Each of the pair of wedges may comprise a first side that faces the first cavity and that is formed with a conical recess that engages the spherical end of the shaft when the pair of wedges are moved toward one another. Each of the pair of wedges may be formed to include a channel extending between the first and second sides.

According to yet another aspect, an adjustable joint may comprise a housing including a first cavity receiving a spherical end of a shaft and a second cavity receiving a tube, a pair of wedges arranged in the housing between the first cavity and the second cavity, and a threaded fastener engaged with the pair of wedges, and a method of repositioning the adjustable joint may comprise rotating the threaded fastener in a first direction to move the pair of wedges away from one another, repositioning at least one of the shaft and the tube relative to the housing, and rotating the threaded fastener in a second direction, opposite the first direction, to move the pair of wedges toward one another to cause the pair of wedges to exert clamping forces on the spherical end of the shaft and on the tube.

BRIEF DESCRIPTION

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 2A is a side view of one of the adjustable joints of FIG. 1;

FIG. 2B is a front view of the adjustable joint of FIG. 2A;

FIG. 2C is a bottom view of the adjustable joint of FIG. 2A;

DETAILED DESCRIPTION

While the concepts of the present disclosure are susceptible to various modifications and alternative forms, specific exemplary embodiments thereof have been shown by way of example in the figures and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Figure 1:
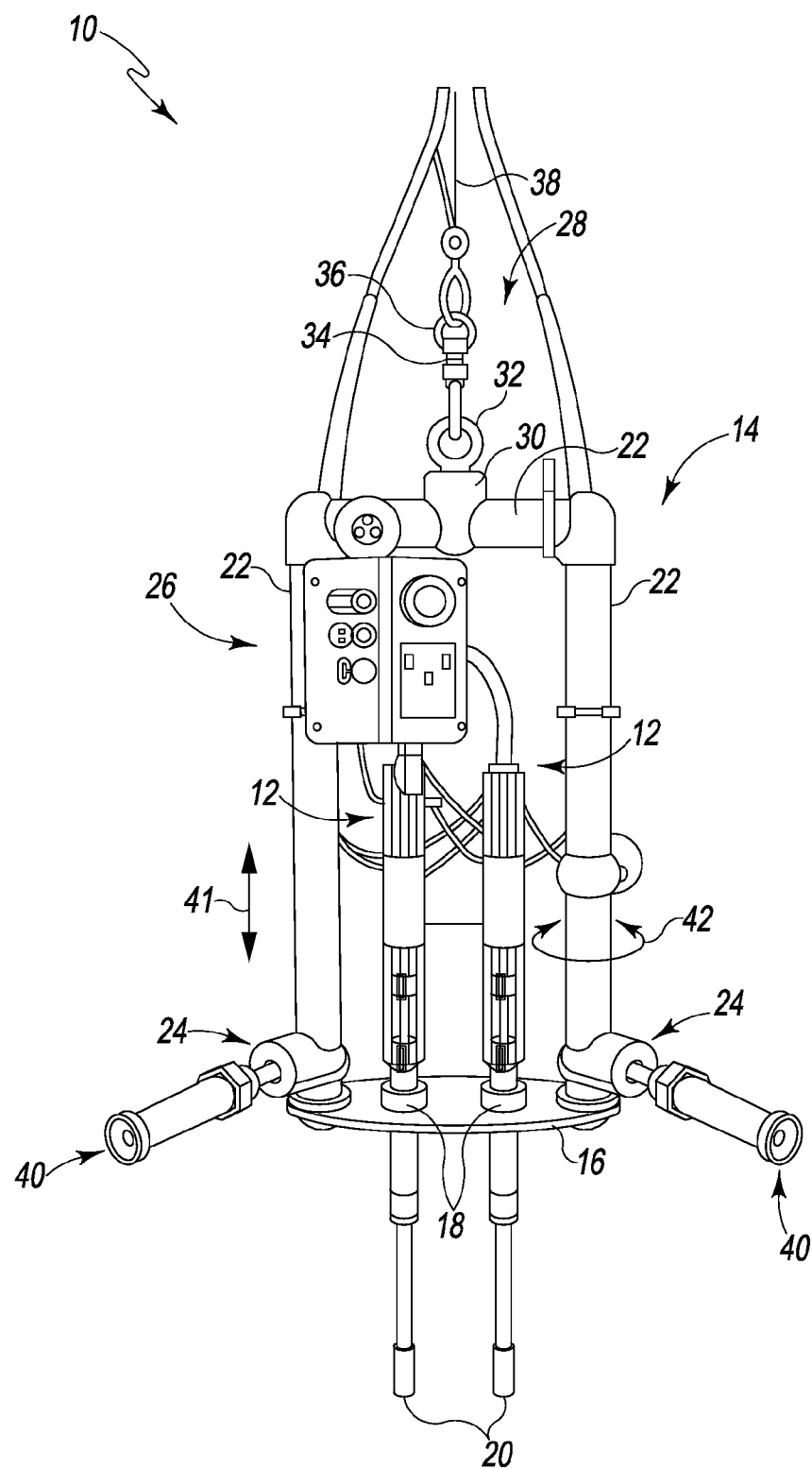
FIG. 1 is a perspective view of one illustrative embodiment of a power tool fixture including a number of adjustable joints.

Referring now to FIG. 1, one illustrative embodiment of a power tool fixture 10 configured to support one or more power tools 12 is shown. In FIG. 1, the two power tools 12 are illustratively shown as nutrunner tools configured to tighten and/or loosen fasteners. It will be appreciated that, due to its modular design, the fixture 10 may alternatively be used to support any number of power tools 12 of any type.

The fixture 10 includes a frame 14 and a support platform 16 coupled to the frame 14, as shown in FIG. 1. The frame 14 and the support platform 16 cooperate to support and secure the power tools 12 on the fixture 10. In the illustrative embodiment, each of the power tools 12 extends through an aperture 18 formed in the support platform 16, such that a fastener end 20 of each power tool 12 is positioned below the support platform 16 relative to the frame 14. The fastener ends 20 of the power tools 12 are each configured to engage a fastener to tighten and/or loosen the fastener. In other embodiments, different styles of support platform 16 may be used to support and secure different numbers and/or types of power tools 12 to the fixture 10.

The frame 14 of the fixture 10 includes a plurality of tubes 22. In the illustrative embodiment of FIG. 1, the support platform 16 is coupled to two vertically extending tubes 22, each of which has an adjustable joint 24 coupled thereto. As shown in FIG. 1, a horizontally extending tube 22 extends between the two vertically extending tubes 22. A control box 26 that provides an operator interface for controlling the power tools 12 is also shown coupled to the horizontally extending tube 22. In some embodiments, the control box 26 may be coupled to one of the tubes 22 via another adjustable joint 24.

In the illustrative embodiment of FIG. 1, a suspension assembly 28 is coupled to the frame 14. The illustrative suspension assembly 28 includes a ring mount 30 coupled to the horizontally extending tube 22, a ring 32 retained by the ring mount 30, a hook 34 configured to couple to the ring 32 and retained by a hook mount 36, and a suspension line 38 coupled to the hook mount 36. The suspension assembly 28 is configured to support the fixture 10 so that the power tools 12 may be positioned as needed to tighten and/or loosen fasteners.

As discussed in more detail below, each of the adjustable joints 24 that is coupled to one of the tubes 22 is selectively repositionable relative to that tube 22. Specifically, when one of the adjustable joints 24 is "unlocked," the adjustable joint 24 may slide along the tube 22 (e.g., in the directions shown by arrow 41 in FIG. 1) and may also rotate about the tube 22 (e.g., in the directions shown by arrow 42 in FIG. 1). Furthermore, the two adjustable joints 24 coupled to the vertically extending tubes 22 each include a handle shaft 40 that may be repositioned to a plurality of positions relative to a housing 44 of the adjustable joint 24 (and, hence, relative to the corresponding tube 22).

Referring now to FIG. 2A, a side view is shown of one of the adjustable joints 24 of FIG. 1 coupled to one of the tubes 22. The adjustable joint 24 includes the shaft 40, the housing 44, a fastener 48, and a pair of wedges 50 (see FIGS. 3-5). The tube 22 is positioned relative to the housing 44 such that the tube 22 extends through a pair of apertures 61, 63 and a cavity 57 formed in the housing 44, as discussed in more detail below. The fastener 48 is positioned in an aperture 65 formed in the housing 44 such that a head of the fastener 48 is accessible from the exterior of the housing 44. As discussed in more detail below, the fastener 48 cooperates with the housing 44, the pair of wedges 50, and the shaft 40 to permit and/or resist repositioning of the adjustable joint 24.

The shaft 40 of the adjustable joint 24 is shown extending away from the tube 22 in a direction substantially parallel to an axis 43 in FIG. 2A (although, as indicated above, the shaft 40 is repositionable relative to the housing 44 and, hence, the axis 43). The tube 22 is shown extending through the housing 44 in a direction substantially parallel to an axis 45. In the illustrative embodiment, the axis 43 is substantially perpendicular to the axis 45, as shown in FIG. 2A.

FIG. 2B illustrates a front view of the adjustable joint 24 shown in FIG. 2A. As described in more detail below, the housing 44 includes a main body 56 and a cap 58. In the illustrative embodiment, the cap 58 is coupled to the main body 56 via a plurality of fasteners 52. When the adjustable joint 24 is assembled, the pair of wedges 50 may be inserted into the housing 44 before the cap 58 is coupled to the housing 44 to partially close the cavity 59. In the illustrative embodiment, the cap 58 is generally U-shaped and partially surrounds the shaft 40 after the adjustable joint 24 is assembled (as shown in FIGS. 2A-C). The shaft 40 extends away from the tube 22 through an aperture 67 formed in the cap 58. It is contemplated that, in other embodiments, the cap 58 may be coupled to the main body 56 via another suitable mechanism (e.g., an interference fit, an adhesive) or may even be integrally formed with the main body 56.

FIG. 2C illustrates a bottom view of the adjustable joint 24 shown in FIG. 2A. As described in more detail below, the cavity 57 receive the tube 22 when the adjustable joint 24 is coupled to the tube 22. The main body 56 of the housing 44 includes a top side 53 in which the aperture 61 is formed and an opposite bottom side 55 (see FIG. 2A) in which the aperture 63 is formed. As described in more detail below, each of the pair of wedges 50 is positioned in the housing 44 between the cavity 57 and the cavity 59 when the adjustable joint 24 is assembled.

Figure 3:
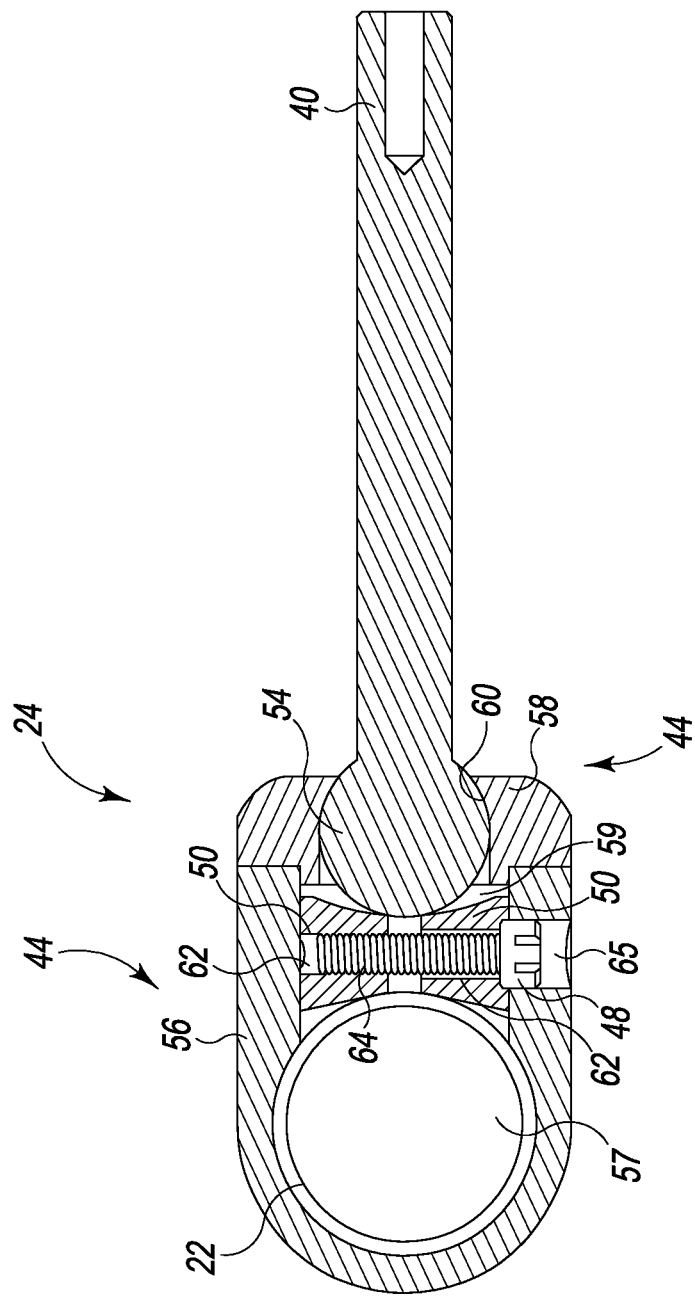
FIG. 3 is a cross-sectional view of the adjustable joint of FIG. 2A, taken about the line 3-3.

Referring now to FIG. 3, a cross-sectional sectional view of the adjustable joint 24 (taken about the line 3-3 of FIG. 2A) is shown. As shown in FIG. 3, the pair of wedges 50 are positioned inside the housing 44 between the cavity 57 and the cavity 59. As such, the pair of wedges 50 engage both the tube 22 and a spherical end 54 of the shaft 40. In particular, the spherical end 54 of the shaft 40 is held between the pair of wedges 50 and an inwardly extending lip 60 of the cap 58.

Each of the wedges 50 includes a bore 62 extending therethrough that is sized to receive the fastener 48. The wedges 50 are positioned inside the housing 44 such that the bores 62 align with the aperture 65. In the illustrative embodiment of FIG. 3, the adjustable joint uses a threaded fastener 48 and the bore 62 of one of the wedges 50 includes threading 64 that engages the threaded fastener 48 (while the bore 62 of the other wedge 50 does not include such threading). However, it will be appreciated that in other embodiments, other types of fasteners 48 (having other mechanisms for engaging one or both of the wedges 50) may be used.

When the adjustable joint 24 is assembled and coupled to the tube 22 (as shown in FIG. 3), the fastener 48 engages the bore 62 of at least one of the wedges 50. The fastener 48 is movable to adjust the position of the pair of wedges 50 in the relative to one another. In the illustrative embodiment shown in FIG. 3, the threaded fastener 48 is configured to move the pair of wedges 50 toward one another when the threaded fastener 48 is rotated in one direction (e.g., a clockwise direction), thereby increasing clamping forces exerted by the pair of wedges 50 on the tube 22 and on the spherical end 54 of the shaft 40. These clamping forces resist movement of the tube 22 relative to the housing 44 and movement of the shaft 40 relative to the housing 44.

Conversely, the threaded fastener 48 is configured to move the pair of wedges 50 away from one another when the threaded fastener 48 is rotated in the opposite direction (e.g., a counter-clockwise direction), thereby decreasing the clamping forces exerted by the pair of wedges 50 on the tube 22 and on the spherical end 54 of the shaft 40. Once these clamping forces are released (or sufficiently decreased), the housing 44 of the adjustable joint 24 is permitted to move relative to the tube 22, and the shaft 40 is permitted to move relative to the housing 44. It will be appreciated that, according to the present disclosed design, movement of the pair of wedges 50 toward or away from one another (and, thus, transitioning of the adjustable joint 24 between locked and unlocked states) may be accomplished via manipulation of a single fastener 48.

Figure 4:
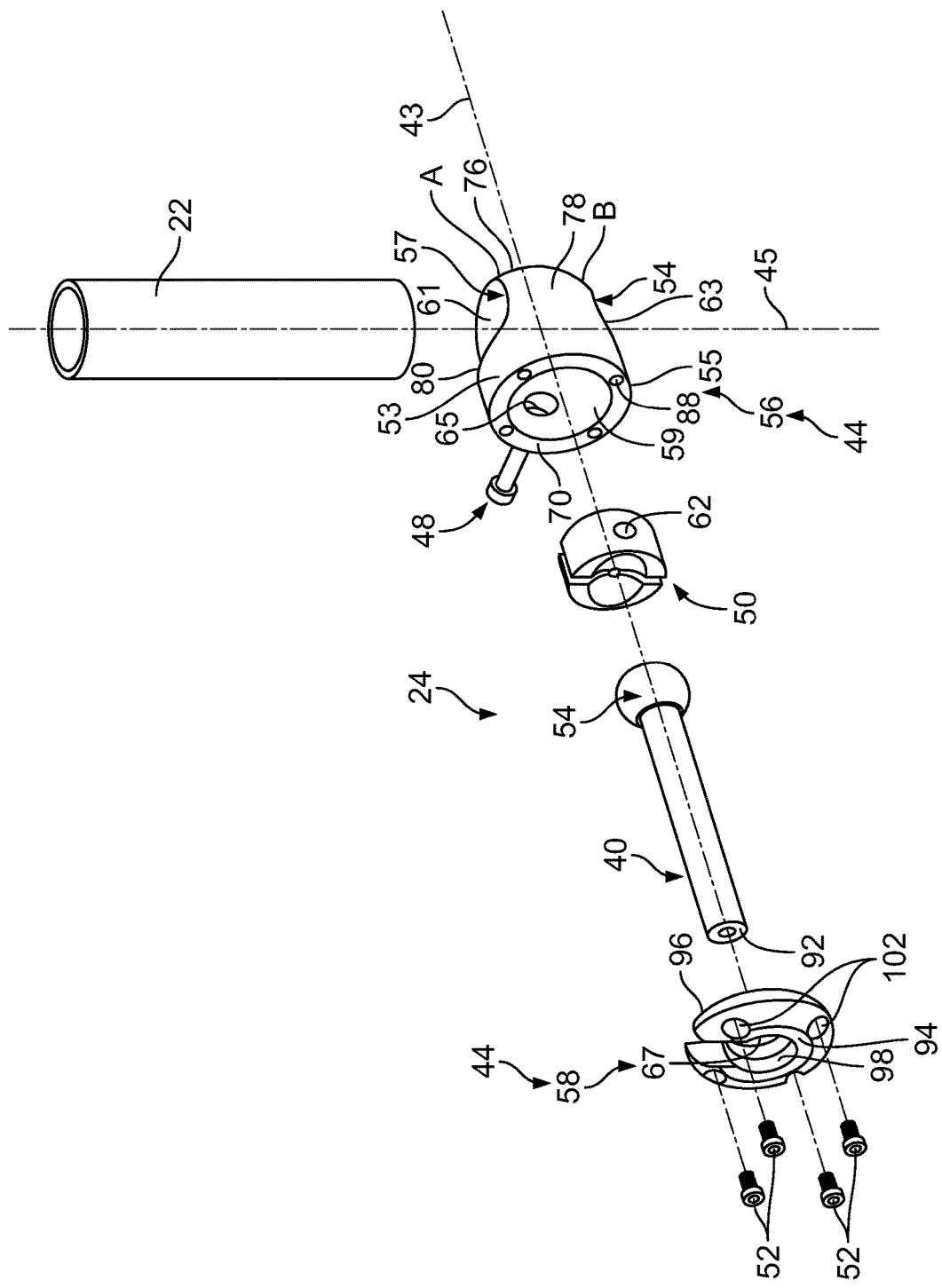
FIG. 4 is an exploded assembly view of the adjustable joint of FIG. 2A.

Referring now to FIG. 4, an exploded assembly view of the adjustable joint 24 described above is shown. As mentioned above, the main body 56 of the housing 44 is formed to include the cavities 57, 59 (which are separated by the pair of wedges 50 once the adjustable joint 24 is assembled). The cavity 57 is sized to receive the tube 22, and the cavity 59 is sized to receive the spherical end 54 of the shaft 40. As will be appreciated from FIG. 3, the cap 58 also partially defines the cavity 57 once the adjustable joint 24 is assembled.

In the illustrative embodiment, the main body 56 of the housing 44 includes a top side 53, a bottom side 55 opposite the top side 53, a front side 70, a back side 76 opposite the front side 70, a right side 78 and a left side 80 opposite the right side 78, as shown in FIG. 4. The top side 53 of the main body 56 extends between the front side 70 and the back side 76, as shown in FIG. 4. The aperture 61 (which opens to the cavity 57) is formed in the top side 53 of the main body 56. The aperture 61 has a generally circular shape that substantially matches the cross-sectional shape of the tube 22, as suggested in FIG. 4. The bottom side 55 of the main body 56 extends between the front side 70 and the back side 76. The aperture 63 (which also opens to the cavity 57) is formed in the bottom side 55 of the main body 56. The aperture 63 also has a generally circular shape that substantially matches the cross-sectional shape of the tube 22, as suggested in FIG. 4.

The front side 70 of the main body 56 extends between the right and left sides 78, 80 and between the top and bottom sides 53, 55. As shown in FIG. 4, the front side 70 of the main body has an annular shape. In the illustrative embodiment, a number of holes 88 are formed in the front side 70 to receive the plurality of fasteners 52 when the cap 58 is coupled to the main body 56. The back side 76 of the main body 56 extends between the right and left sides 78, 80 and the top and bottom sides 53, 55. In the illustrative embodiment, the back side 76 extends from a point "A" located below the top side 53 of the main body 56 to a point "B" located above the bottom side 55 of the main body 56 (best seen in FIG. 2A).

The right side 78 of the main body 56 extends between the front and back sides 70, 76 and the top and bottom sides 53, 55. Similarly, the left side 80 of the main body 56 extends between the front and back sides 70, 76 and the top and bottom sides 53, 55. In the illustrative embodiment, the aperture 65 (which receives the fastener 48) is formed in the left side 80, as shown in FIG. 4.

The shaft 40 includes the spherical end 54 and an attachment end 92 opposite the spherical end 54, as shown in FIG. 4. The shaft 40 has a generally cylindrical shape between the spherical end 54 and the attachment end 92. The attachment end 92 is configured to be coupled to a device (e.g., a handle, a control box, a camera, etc.) to allow positioning (and repositioning) of the device relative to the tube 22.

In the illustrative embodiment shown in FIG. 4, the cap 58 of the housing 44 is generally U-shaped and includes a front face 94, a rear face 96 opposite the front face 94, and an interior surface 98. The aperture 67 (which opens to the cavity 59) extends through the cap 58 from the front face 94 to the rear face 96 and is partially bounded by the interior surface 98 of the cap 58. As mentioned above, the shaft 40 extends through the aperture 67 when the adjustable joint 24 is assembled. As described above, the cap 58 includes the lip 60 that extends inwardly toward the aperture 67 (best seen in FIG. 3). As such, the interior surface 98 of the cap 58 is curved to generally conform to the spherical end 54 of the shaft 40, in order to retain the spherical end 54 of the shaft 40 in the cavity 59 once the adjustable joint 24 is assembled.

The front face 94 of the cap 58 faces the attachment end 92 of the shaft 40 when the adjustable joint 24 is assembled. The rear face 96 of the cap 58 is generally planar and confronts front side 70 of the main body 56 when the pair of wedges 50 when the cap 58 is coupled to the main body 56 using the plurality of fasteners 52. The cap 58 also includes a plurality of holes 102 extending between its front and rear faces 94, 96 for receiving the plurality of fasteners 52 used to couple the cap 58 to the main body 56.

Figure 5:
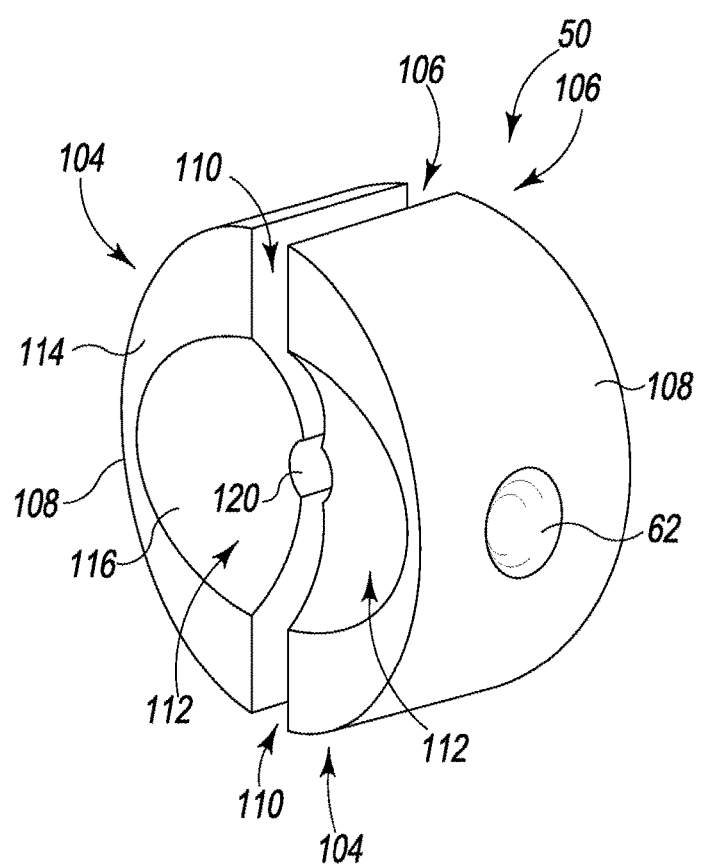
FIG. 5 is a magnified view of a pair of wedges of the adjustable joint of FIG. 4.

Referring now to FIG. 5, the pair of wedges 50 is shown in greater detail. In the illustrative embodiment, each of the wedges 50 includes a front side 104, a rear side 106 opposite the front side 104, an outer surface 108, and an inner surface 110. When the adjustable joint 24 is assembled, the inner surfaces 110 of the wedges 50 face one another, as shown in FIG. 5. The inner surface 110 of each wedge 50 extends between the front and rear sides 104, 106 of the wedge 50. In the illustrative embodiment, the inner surfaces 110 are generally planar, but each include a channel 120 formed therein. As shown in FIG. 5, the channel 120 formed in each wedge 50 extends between the front and rear sides 104, 106 and has a generally semi-circular cross-section.

In the illustrative embodiment, the outer surface 108 of each wedge 50 is curved, having a generally semi-circular shape, and extends between the front and rear sides 104, 106 of the wedge 50. When the adjustable joint 24 is assembled, the outer surfaces 108 of the wedges 50 generally face away from one another, as shown in FIG. 5. The bore 62 formed in each of the wedges 50 extends from the outer surface 108 to the inner surface 110 (and, more particularly, to the channel 120).

The front sides 104 of the wedges 50 face the cavity 59 (and, hence, the spherical end 54 of the shaft 40) when the adjustable joint 24 is assembled. The front sides 104 are each formed to include a conical recess 112 that that receives a portion of the spherical end 54 of the shaft 40 when the wedges 50 are moved toward one another (via the fastener 48). In particular, the front side 104 of each wedge 50 includes a planar surface 114 and a curved engagement surface 116 that defines the conical recess 112, as shown in FIG. 5. When the pair of wedges 50 are moved toward one another (as described above), the engagement surface 116 on the front side 104 of each wedge 50 exerts a clamping force on the spherical end 54 of the shaft 40 to resist movement of the shaft 40 relative to the housing 44.

The rear sides 106 of the wedges 50 face the cavity 57 (and, hence, the tube 22) when the adjustable joint 24 is assembled. A surface of the rear side 106 of each wedge 50 is non-parallel to a surface of the front side 104 of the same wedge 50, such that a thickness of each wedge 50 varies between the outer surface 108 and the inner surface 110 (i.e., along a length of the bore 62 formed in each wedge 50). In the illustrative embodiment, the rear sides 106 of the wedges 50 include generally planar surfaces that engage the tube 22 when the wedges 50 are moved toward one another (via the fastener 48). When the pair of wedges 50 are moved toward one another (as described above), the generally planar surface on the rear side 106 of each wedge 50 exerts a clamping force on the tube 22 to resist movement of the housing 44 relative to the tube 22. It is contemplated that, in other embodiments, the rear sides 106 (as well as the front sides 104) may have other shapes and configurations. For instance, in some embodiments, the rear side 106 of each wedge 50 may have a curved surface that generally conforms to an outer surface of the tube 22.

As will be appreciated from the foregoing description, the illustrative adjustable joint 24 allows for relatively simple repositioning of the shaft 40 relative to the tube 22. First, to unlock the adjustable joint 24, a user may rotate the threaded fastener 48 in one direction (e.g., a counter-clockwise direction) to move the pair of wedges 50 away from one another. This movement of the wedges 50 away from one another will release (or, at least, decrease) the clamping forces exerted by the wedges 50 on the tube 22 and the spherical end 54 of the shaft 40. The user may then reposition the shaft 40 relative to the housing 44 and/or the tube 22 relative to the housing 44. Once the desire position is achieved, the user may then rotate the threaded fastener 48 in the opposite direction (e.g., a clockwise direction) to move the pair of wedges 50 toward one another. This movement of the wedges 50 toward one another will increase the clamping forces exerted by the wedges 50 on the tube 22 and the spherical end 54 of the shaft 40, thereby resisting movement of these components relative to one another.

Although the illustrative embodiment of the adjustable joint 24 has been illustrated in FIGS. 1-5 and described herein as receiving the tube 22 in the cavity 57, it is also contemplated that, in other embodiments of the adjustable joint 24, the cavity 57 may instead receive a spherical end of a second shaft (similar to the spherical end 54 of the shaft 40). In such embodiments, the half of the housing 44 that defines the cavity 57 may be a mirror image of the half of the housing 44 that defines the cavity 59 (and receives the spherical end 54 of the shaft 40, as shown in FIGS. 2-4). Furthermore, in such embodiments, the rear side 106 of each wedge 50 may include a planar surface and a curved engagement surface that define a conical recess (similar to the front side 104 of the illustrative embodiment shown in FIG. 5).

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. For instance, while described in the context of a power tool fixture 10, it will be appreciated that the presently disclosed adjustable joints 24 have broad application in any number of other contexts.

There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. An adjustable joint comprising:
a housing formed to include a first cavity and a second cavity;
a shaft having a spherical head at its end;
a tube;
wherein the tube has a longitudinal extent;
wherein the first cavity receives the spherical head of the shaft and the second cavity receives the longitudinal extent of the tube;
a pair of wedges, both located and arranged inside, and supported by, the housing between the first and second cavities, each of the pair of wedges being formed to include a bore and having (i) a first side that faces the first cavity and has a planar surface, wherein a recess is formed in the planar surface and forms a curved engagement surface that engages the spherical end of the shaft when the pair of wedges are moved toward one another, and (ii) a planar second side located opposite the first side and faces the second cavity, wherein the planar second side engages a surface of the longitudinal extent of the tube when the pair of wedges are moved toward one another;
wherein the recess of the first side of the pair of wedges engages the spherical end of the shaft simultaneously with the planar second side of the pair of wedges engaging the tube;
a threaded fastener received by the bore of each of the pair of wedges, the threaded fastener being engaged with at least one of the pair of wedges and configured to (i) move the pair of wedges away from one another, when the threaded fastener is rotated in a first direction, and (ii) move the pair of wedges toward one another, when the threaded fastener is rotated in a second direction opposite the first direction.

2. The adjustable joint of claim 1, wherein the bore formed in one of the pair of wedges includes threading that engages the threaded fastener.

3. The adjustable joint of claim 2, wherein the bore formed in the other one of the pair of wedges does not include threading that engages the threaded fastener.

4. The adjustable joint of claim 1, wherein each of the pair of wedges is formed to include a channel extending between the first and second sides.

5. The adjustable joint of claim 1, wherein the housing is formed to include:
a first aperture that opens to the first cavity;
a second aperture that opens to the second cavity; and
a third aperture that opens to the second cavity, the second and third apertures being formed in opposing sides of the housing.

6. The adjustable joint of claim 5, wherein a first hypothetical axis that passes through the first aperture is perpendicular to a second hypothetical axis that passes through the second and third apertures.

7. The adjustable joint of claim 5, wherein the housing comprises a main body and a cap removably coupled to the main body, wherein the first aperture is formed in the cap and the second and third apertures are formed in the main body.

8. The adjustable joint of claim 7, wherein the cap comprises a lip that extends inwardly toward the first aperture and that is configured to retain the spherical end of the shaft in the first cavity.

9. The adjustable joint of claim 7, wherein the threaded fastener passes through a fourth aperture that is formed in the main body of the housing.

10. The adjustable joint of claim 1, wherein the planar second side of each wedge of the pair of wedges has a planar surface, wherein the planar surface of the planar second side of one of the each wedge is oriented non-parallel to the planar surface of the other of the each wedge.

11. A method of repositioning an adjustable joint comprising a housing including a first cavity receiving a spherical end of a shaft and a second cavity receiving a tube, a pair of wedges located, movable, and arranged in the housing between the first cavity and the second cavity and each having a first side that faces the first cavity and a planar second side that faces the second cavity, wherein the tube has a longitudinal extent, wherein the first side of the pair of wedges has a planar surface with a recess forming a curved engagement surface disposed within said planar surface, wherein the second side of each wedge of the pair of wedges has a planar surface, wherein the planar surface of the second side of one of the each wedge is oriented non-parallel to the planar surface of the other of the each wedge, and a threaded fastener received by the pair of wedges and engaged with at least one of the pair of wedges, the method comprising the steps of:
rotating the threaded fastener in a first direction to move the pair of wedges away from one another;
receiving the longitudinal extent of the tube in the second cavity of the housing;
repositioning at least one of the spherical end of the shaft and the tube relative to the housing; and
rotating the threaded fastener in a second direction, opposite the first direction, to move the pair of wedges toward one another to simultaneously cause (i) the curved engagement surface of the first side of the pair of wedges to engage the spherical end of the shaft and exert clamping forces on the spherical end of the shaft while at the same time (ii) the planar surface of the second side of the pair of wedges engages the longitudinal extent of the tube to exert clamping forces on the tube.

* * * * *